United States Patent [19]

Klunder

[11] Patent Number: 5,447,351
[45] Date of Patent: Sep. 5, 1995

[54] SAFETY TONGS

[76] Inventor: Joyce A. Klunder, 2315 Jasper Ave., New Hampton, Iowa 50659

[21] Appl. No.: 34,766

[22] Filed: Mar. 19, 1993

[51] Int. Cl.⁶ ............................................. A47G 21/10
[52] U.S. Cl. ................................. 294/99.2; 16/116 R
[58] Field of Search ............... 294/3, 7, 8, 8.5, 11, 294/28, 33, 99.2; 403/267, 269; 30/343, 142, 150; 16/116 R, DIG. 19, DIG. 24

[56] References Cited

U.S. PATENT DOCUMENTS

| | | | |
|---|---|---|---|
| 448,155 | 3/1891 | Merrill | 294/99.2 |
| 745,882 | 12/1903 | Miller | 294/99.2 X |
| 1,515,622 | 11/1924 | Sarlabous et al. | 294/33 |
| 1,728,619 | 9/1929 | Lambert | 16/116 R X |
| 1,860,596 | 5/1932 | Reinold | 16/116 R |
| 2,362,395 | 11/1944 | Ozdobinski | 294/8.5 X |
| 2,382,304 | 8/1945 | Foltz et al. | 30/343 |
| 2,411,825 | 11/1946 | Ferguson | 294/99.2 |
| 4,768,288 | 9/1988 | Culbertson | 294/99.2 X |
| 4,785,495 | 11/1988 | Dellis | 16/DIG. 19 |
| 4,974,286 | 12/1990 | Stowell et al. | 16/116 R X |

FOREIGN PATENT DOCUMENTS

| | | | |
|---|---|---|---|
| 1419496 | 10/1965 | France | 294/99.2 |
| 666669 | 2/1952 | United Kingdom | 30/142 |

Primary Examiner—Dean Kramer
Attorney, Agent, or Firm—Watson, Cole, Grindle & Watson

[57] ABSTRACT

Safety tongs have a spring with ends embedded in molded heat insulating handles and a pair of grippers which are likewise embedded in the free ends of the handles. The handles have integral portion which deflect liquid such as grease and the safety tongs are free of crevices in which foods and debris can accumulate.

5 Claims, 2 Drawing Sheets

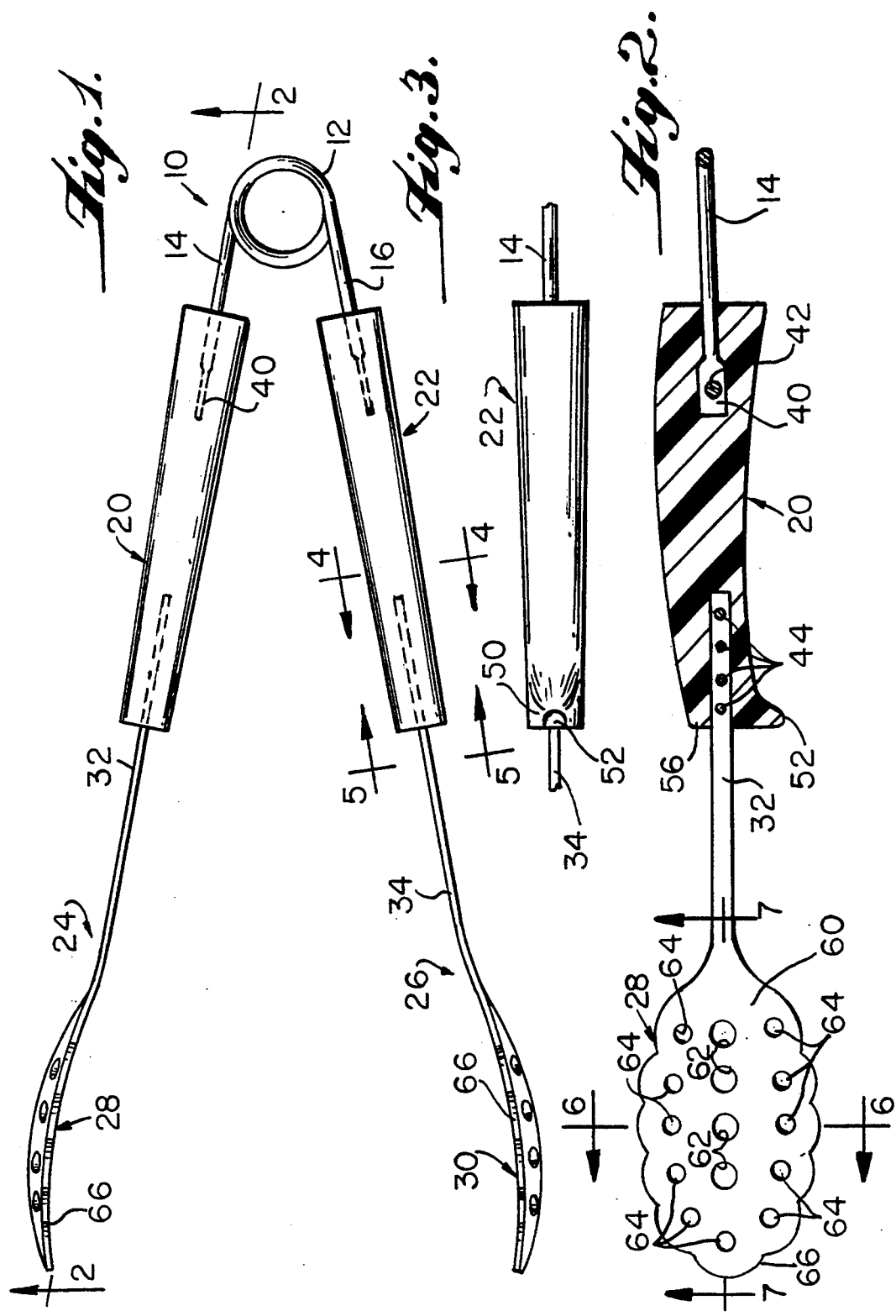

SAFETY TONGS

BACKGROUND OF THE INVENTION present invention relates to safety tongs, and more particularly to tongs which are especially adapted for use with steam tables which are used for keeping foods warm in a restaurant. Such steam tables generally include a plurality of cutout portions which support pans therein. Each pan receives food of different types, and some foods may contain a considerable amount of liquid including grease. It is a principal object of the invention to provide tongs which may be safely used in this type of environment where the various components of the steam table are very hot, and where foods to be picked up by the tongs are also quite hot and include hot liquids which could injure the hands of a person utilizing the tongs.

Prior art tongs used with steam tables usually employ metallic components. The metallic components often extend from one end of the tongs to the other whereby heat is readily transmitted between opposite ends of the tongs. There is accordingly a possibility of a person's hands coming into contact with a dangerously hot portion of the tongs remote from the gripping end. It is therefore desirable to provide means for insulating the metallic components at opposite ends of the tongs from one another so that this dangerous condition is eliminated.

Another problem encountered with the prior art is that when food is lifted up by the tongs, the gripping portions thereof become elevated above the handles thereof so that there is a tendency for hot liquids associated with the food to run down to the handles of the tongs and into contact with a person's hands. It is important to provide a construction which prevents hot liquids from coming into contact with a person's hands in this manner.

A further problem which arises in connection with the use of tongs with a steam table is the fact that the tongs are generally placed so as to rest on the edge of a pan in the steam table. Tongs will often slide down into the food within the pan, which of course is unsatisfactory. It is accordingly important to provide tongs with a construction which will prevent the tongs from sliding into an associated pan and further which will also prevent a person's hand from sliding forward on the tongs to a position where the hand could come into contact with heated material of one kind or another.

Tongs of conventional construction include crevices or spaces within which food particles can accumulate. This is disadvantageous since germs can breed in areas where food accumulates, and therefore it is important to eliminate any such crevices or spaces to the extent possible. The tongs should also be formed of a material which is durable, resists bending and which also does not contaminate the food with which it is used.

The tongs should also have a natural feel when in use, and should be durable and long lasting with minimum maintenance requirements.

SUMMARY OF THE INVENTION

The tongs of the present invention include a metallic spring means having opposite end portions which are each embedded within a first end of an associated molded handle formed of heat insulating material. A pair of metallic grippers are provided, each gripper having a shank embedded within a second end of an associated handle. The spring end and shank portion embedded within each of the handles are spaced from one another a substantial distance so that they are thermally insulated from one another and heat will not be transmitted from the shank of the gripper to the spring means. Furthermore, this arrangement makes it less likely that the handle itself will heat up since a substantial length of the handle has no metallic components therein.

The handles of the invention are each provided with a laterally extending projection at the end thereof adjacent the shank portion of the associated gripper for directing liquid away from the shank portion and away from the fingers of a person holding the handles in his hand. The projection includes an end surface which tapers to a smaller dimension in a direction laterally away from the shank portion to facilitate movement of liquid to a point at the end of the tapered portion so that liquid dropping by gravity from the end of the tapered portion will not come into contact with a person's hand holding the tongs.

To ensure that liquid moving along the shank portion will not come into contact with a person's hand, the shank portion of each gripper is spaced inwardly from the outer edge of the end surface of the associated handle. The gripping portions of each gripper are also provided with holes therethrough so that hot liquids may pass through the holes and fall by gravity into a pan in a steam table thereby reducing the amount of hot liquid which might flow toward the handles of the tongs. The gripping portions are provided with scalloped edges to facilitate gripping of irregular shaped pieces of food.

The lateral projections on the handles also serve to prevent a person's hand from slipping off of the handles in the direction of the gripping portions of the tongs. The projections serve the further purpose of engaging the lip of a pan in a steam table thereby providing a means for preventing the tongs from sliding down into the hot food within the pan.

The portions of the spring means and shank portions of the grippers which are embedded within the handles have one or more holes therethrough, and integral portions Of the handle extend through these holes to thereby anchor the associated components within the handle and prevent them from pulling out. The shank portions are flat and the ends of the spring means are flattened whereby the grippers and the spring means are prevented from rotating within the handles during use.

The molded one-piece construction of the invention eliminates any crevices or spaces wherein food particles could accumulate, thereby providing a more sanitary construction. The metallic members are formed of stainless steel providing a durable structure which resists bending and which protects against the contamination of food. The tongs require no maintenance and are comfortable to use, while having a natural feel when being held in the hand. The spring means maintains the tongs in open position and provides proper resistance to squeezing movement of the hand. The spring means also enables the tongs to be readily hung up for storage.

BRIEF DESCRIPTION OF THE DRAWINGS

FIG. 1 is front view of a pair of tongs according to the invention;

FIG. 2 is a sectional view taken along line 2—2 of FIG. 1;

FIG. 3 is a bottom view of one of the handles shown in FIG. 1;

DESCRIPTION OF THE PREFERRED EMBODIMENT

Figure 4:
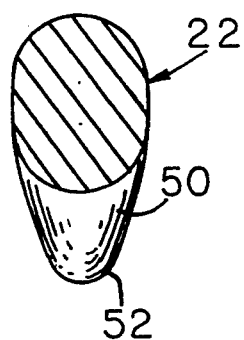
FIG. 4 is a sectional view taken along line 4—4 of FIG. 1.

Referring now to the drawings wherein like reference characters designate corresponding parts throughout the several views, a spring means indicated by reference numeral 10 is formed of stainless steel and includes a central spring loop 12 and a pair of opposite end portions 14 and 16. A pair of identical molded handles 20 and 22 are formed of a suitable durable hard plastic which is a good thermal insulator such as a polymeric thermosetting resin which in a typical example may be urea formaldehyde. A pair of identical grippers are indicated generally by reference numerals 24 and 26 which include gripping portions 28 and 30 as well as shank portions 32 and 34 respectively.

The spring means is formed of a single piece of resilient material having a substantially circular cross-section. Each of the spring ends is of identical construction, and as seen in FIG. 2, spring end portion 14 is embedded within the molded handle 20 and has a flattened end portion 40 having a hole 42 formed therethrough. An integral portion of the handle 20 extends through the hole to anchor the spring end in place, it being understood that the material of the handle will flow through through the hole during the molding process when the material of the handle is in a liquid state.

The shank portions 32 and 34 are flat, and as seen in FIG. 2, the part of the shank portion 32 which is embedded within the handle 20 is provided with a plurality of holes 44 formed therethrough and longitudinally spaced from one another along the length of the shank portion. Integral portions of the handle 20 extend through the holes in the shank portion to anchor the shank portion in place, these integral portions also being formed during the molding process.

It will be noted as seen in FIG. 2 that the end of the spring means and the shank portion which are embedded within the handle are spaced from one another a substantial distance so that they are thermally insulated from one another thereby preventing the spring means and the handle from being excessively heated up during use of the tongs.

Figure 5:
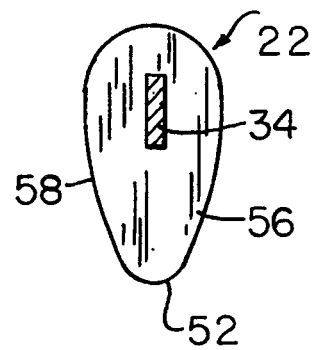
FIG. 5 is a sectional view taken along line 5—5 of FIG. 1.

The handles include identical laterally extending projections at the ends thereof receiving the shank portions of the associated grippers; and as seen in FIGS. 3, 4 and 5, handle 22 includes a laterally extending projection 50 which tapers to a smaller dimension in a direction laterally away from the associated shank to the outer end 52 thereof which is somewhat rounded. The laterally extending projections on the handles serve to direct liquid away from the associated shank portion laterally of the handle and away from the fingers of a person holding the handles in his hand.

As seen in FIG. 5, each handle has an end surface 56 thereon which has an outer edge 58. The shank portion 34 of the associated gripper is spaced inwardly from outer edge 58 to ensure that no liquid flowing along the shank portion will flow onto the hand of a person holding the tongs. The liquid will pass along surface 56 to the outer end 52 of projection 50 from whence it will drop by gravity so as not to impinge on a person's hand.

Figure 7:
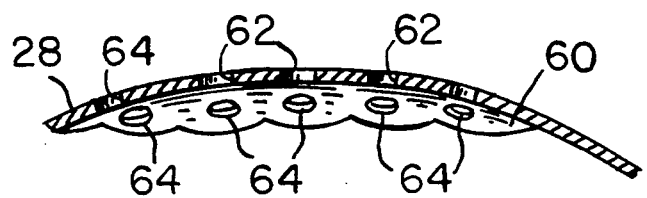
FIG. 7 is a sectional view taken along line 7—7 of FIG. 2.
Figure 6:
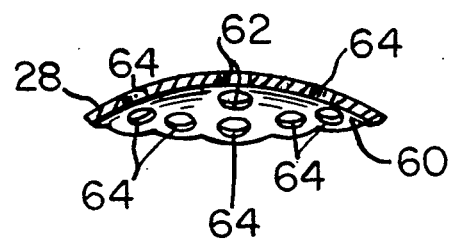
FIG. 6 is a sectional view taken along line 6—6 of FIG. 2.

Referring to FIGS. 2, 6 and 7, it will be seen that the gripping surface 60 of gripping portion 30 is of concave construction and has a first row of large holes 62 extending along the length thereof with a second plurality of smaller holes 64 extending around the row of holes 62. These holes allow hot liquid to pass therethrough while in use. The outer edge 66 is of scalloped construction to assist in gripping articles or food of irregular configuration.

The invention has been described with reference to a preferred embodiment. Obviously, various modifications, alterations and other embodiments will occur to others upon reading and understanding this specification. It is our intention to include all such modifications, alterations and alternate embodiments insofar as they come within the scope of the appended claims or the equivalent thereof.

What is claimed is:

1. Safety tongs comprising metallic spring means having opposite end portions, a pair of elongated handles having a longitudinal dimension, said handles being formed of molded heat insulating material and having opposite ends, one of said spring end portions being embedded within and completely surrounded by a first end of one of said handles to form the only connection between said spring means and said one handle, the other of said spring end portions being embedded within and completely surrounded by a first end of a second one of said handles to form the only connection between said spring means and said second handle, a pair of grippers each of which has a gripping portion at one end thereof and a shank portion at the other end thereof, the shank portion of one of said grippers being embedded within and completely surrounded by a second end of said one handle to form the only connection between said one gripper and said one handle, the shank portion of the other of said grippers being embedded within and completely surrounded by a second end of said second handle to form the only connection between said other of said grippers and said second one of said handles, thereby providing a molded one-piece construction having no crevices or spaces where food particles could accumulate, anchor means surrounded by said handles for anchoring said spring end portions and said gripper shank portions within the associated handles, the spring end portion and the gripper shank portion embedded within each of said handles being spaced from one another longitudinally of the associated handle a substantial distance so that they are thermally insulated from one another, said handles each having a laterally extending projection at said second end thereof for directing liquid away from the associated shank portion laterally of the handle, each of said projections including an end surface at the end of the associated handle which tapers substantially continuously to a smaller dimension downwardly when the tongs are held in a person's hand and in a direction laterally away from the associated shank portion to an outer end, each of said end surfaces including an outer edge, each of said shank portions at said end surface being spaced a substantial distance from the outer-edge of the associated end surface so that liquid flowing from a shank portion will pass along the associated surface to said outer end to drop by gravity from said outer end and will not impinge on the fingers of a person holding the tongs.

2. Safety tongs as defined in claim 1 wherein said spring means is formed of resilient material having a substantially circular cross-section, said anchor means including a flattened end portion on each of said spring end portions.

3. Safety tongs as defined in claim 2 wherein said flattened end portion of each of said spring end portions has a hole formed therethrough, an integral portion of the associated handle extending through said hole.

4. Safety tongs as defined in claim 1 wherein said anchor means includes a flattened portion on each of said shank portions, each of said flattened portions having a plurality of spaced holes formed therethrough, an integral portion of the associated handle extending through each of said holes.

5. Safety tongs as defined in claim 1 wherein each of said gripping portions includes a gripping surface of concave configuration having a plurality of holes formed therethrough, said gripping portions each having outer edges of scalloped configuration.

* * * * *